US007467994B2

(12) United States Patent
Griffiths et al.

(10) Patent No.: US 7,467,994 B2
(45) Date of Patent: Dec. 23, 2008

(54) VARIABLE SIZE CARCASS CONTAMINANT REMOVAL

(76) Inventors: Terry Cemlyn Griffiths, 2762 Elberton Rd., Carlton, GA (US) 30627; Larry Paul Griffiths, 122 David Ave., Collinsville, IL (US) 62234; Gregory Lynn Bilyeu, 20850 Irving Rd., Chanute, KS (US) 66720; Floyd Duane Dutton, 429 Fairway Dr., Pueblo, CO (US) 81007

( * ) Notice: Subject to any disclaimer, the term of this patent is extended or adjusted under 35 U.S.C. 154(b) by 118 days.

(21) Appl. No.: 11/617,062

(22) Filed: Dec. 28, 2006

(65) Prior Publication Data
US 2008/0039002 A1      Feb. 14, 2008

Related U.S. Application Data

(60) Provisional application No. 60/822,274, filed on Aug. 14, 2006.

(51) Int. Cl.
*A22B 5/00*      (2006.01)
(52) U.S. Cl. ....................................................... 452/52
(58) Field of Classification Search ................ 452/173, 452/75, 76, 87–93, 63, 52
See application file for complete search history.

(56) References Cited

U.S. PATENT DOCUMENTS

| 4,179,772 | A | * | 12/1979 | Harben, Jr. ............... 452/90 |
| 4,514,879 | A | * | 5/1985 | Hazenbroek ............... 452/91 |
| 5,352,153 | A | * | 10/1994 | Burch et al. ............... 452/157 |
| 5,484,332 | A | * | 1/1996 | Leech et al. ............... 452/173 |
| 5,605,503 | A | * | 2/1997 | Martin ..................... 452/173 |
| 5,882,253 | A | * | 3/1999 | Mostoller ................. 452/173 |
| 7,207,879 | B2 | * | 4/2007 | Kelly et al. ............... 452/77 |

* cited by examiner

*Primary Examiner*—Thomas Price
(74) *Attorney, Agent, or Firm*—Ronald E. Smith; Smith & Hopen, P.A.

(57) ABSTRACT

A washer cabinet has a bottom floor, a top wall, and a pair of upstanding sidewalls to define a channel that extends the length of the cabinet. The channel has an entry end and an exit end. An overhead track suspends animal carcasses in alignment with the channel. A plurality of rotating appendages and a plurality of fluid nozzles are positioned within the cabinet. An animal carcass suspended from the overhead track is moved into the cabinet through the entry end. The carcass comes into contact with the rotating appendages and is washed by fluid emitted from the fluid nozzles as it traverses the length of the cabinet before exiting at the exit end.

12 Claims, 5 Drawing Sheets

VARIABLE SIZE CARCASS CONTAMINANT REMOVAL

BACKGROUND OF THE INVENTION

1. Field of the Invention

This invention relates to a low-water, high-efficiency system for removing contaminants from variable size animal carcasses.

2. Description of the Prior Art

The USDA Food Safety and Inspection Service requires the beef industry to use high pressure (750 psi) fluids to remove contaminates from carcasses. The use of high pressure fluids has a number of drawbacks including high water consumption and high energy requirements needed for pressurizing the water. Water usage can exceed three hundred gallons per minute (300 gpm).

Thus there is a need for a method of removing contaminants from variable size animal carcasses such as cattle while materially enhancing the quality of the environment by restoration and maintenance of water resources.

Pressurizing a large volume of water consumes substantial electrical energy.

Thus there is a need for reduction of energy consumption by the industrial equipment used to remove contaminants.

However, in view of the prior art taken as a whole at the time the present invention was made, it was not obvious to those of ordinary skill how the identified needs could be fulfilled.

SUMMARY OF INVENTION

The novel structure removes contaminates from beef and other variable size animal products by physical contact using varying lengths and types of appendages attached to rotating devices.

The location and inclination of the rotating devices is not necessarily fixed as in poultry wherein carcass size is substantially uniform, although fixed rotating devices are within the scope of this invention. The rotating devices require repositioning along the vertical and horizontal axis during cleaning and processing.

Increased speed of the rotating devices, relative to devices used in poultry processing, is required to remove hundreds of pounds of contaminates, as distinguished from milligrams of contaminates in poultry.

The inside and outside of the product is cleaned by having physical contact with the rotating devices. The fluid pressure is reduced considerably (below 300 PSI as distinguished from 750 PSI in current beef-cleaning devices), thus reducing the consumption of fluids and electrical power required by prior art devices to perform the cleaning and processing. Because of the increased size of the product being cleaned and processed, the rotating devices are increased in overall diameter relative to poultry-dedicated devices.

The novel method also includes the removal of meat from bones, commonly referred to as mechanical deboning, as well as cleaning the carcass and individual parts of the carcass.

The length and diameter of the rotating device is determined by the product to be cleaned and processed. The appendages attached to the rotating device may be made of any food grade USDA approved material and attached to a core. The appendages and core may also be a one piece molded unit. The core may be bored through the center with a hole sized to accommodate the drive shaft. The core may also be machined to be driven acting as its own drive shaft.

The novel method includes the following steps.

The product to be cleaned and processed is introduced into the washer cabinet via an over head track system by specially designed carriers attached and suspended below the track.

The product enters through an opening on the entrance end of the cabinet and passes through the cabinet below the first of several fluid dispensing headers. The headers dispense fluids via spray nozzles of varying spray angles and flow rates. These headers are placed along the carrier path in strategic locations and allow fluids to be projected three hundred sixty degrees around the product.

As the product continues through the cabinet it encounters the first of several sets of rotating devices. The rotating devices are supported by shafts and are positioned on the shafts to best accomplish cleaning and processing of the product. The rotating devices rotate clockwise and counter-clockwise and descend below the horizontal plane. These rotating devices help to remove unwanted material from the product. As the product continues through the cabinet it encounters additional rotating devices and headers.

Additional headers have been specifically designed for each set of rotating devices and positioned to project fluids onto them during operation to help prevent cross contamination.

The rotating devices are turned via rotating shafts by external mechanical power devices. They are held in place by the mechanical power devices and encased ball bearings. Each rotating device set has its own mechanical power devices and encased ball bearings.

The product passes through a yoke type header before exiting the cabinet. This header flushes any loose unwanted material from the product. It is designed to flush from the top to the bottom.

A stainless steel cabinet encloses all headers and rotating devices. Access ports are provided for cleaning and maintenance. The cabinet bottom is fitted with drains to evacuate fluids. All materials are USDA approved for use in the food industry.

The use of the novel washer reduces by approximately sixty five percent (65%) the amount of water necessary to meet current cleaning standards. Electrical power consumption is also reduced due to the lower horsepower requirements needed to produce sufficient fluid pressures.

The physical size, shape, and method of presentation of the product being cleaned and processed necessitates a completely new approach to removal and processing of same. An exemplary embodiment of the invention includes a washer cabinet having a bottom, sides, an entry end, an exit end, a top, a channel extending along the length of the cabinet, an overhead track disposed above the cabinet for suspending animal carcasses in alignment with the channel, a plurality of rotating appendages within the cabinet, and a plurality of fluid nozzles within the cabinet, whereby an animal carcass suspended from the overhead track is moved into the cabinet through the entry end where it comes into contact with the rotating appendages and is washed by fluid emitted from the fluid nozzles as it traverses the length of the cabinet before coming out the exit end of the cabinet.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
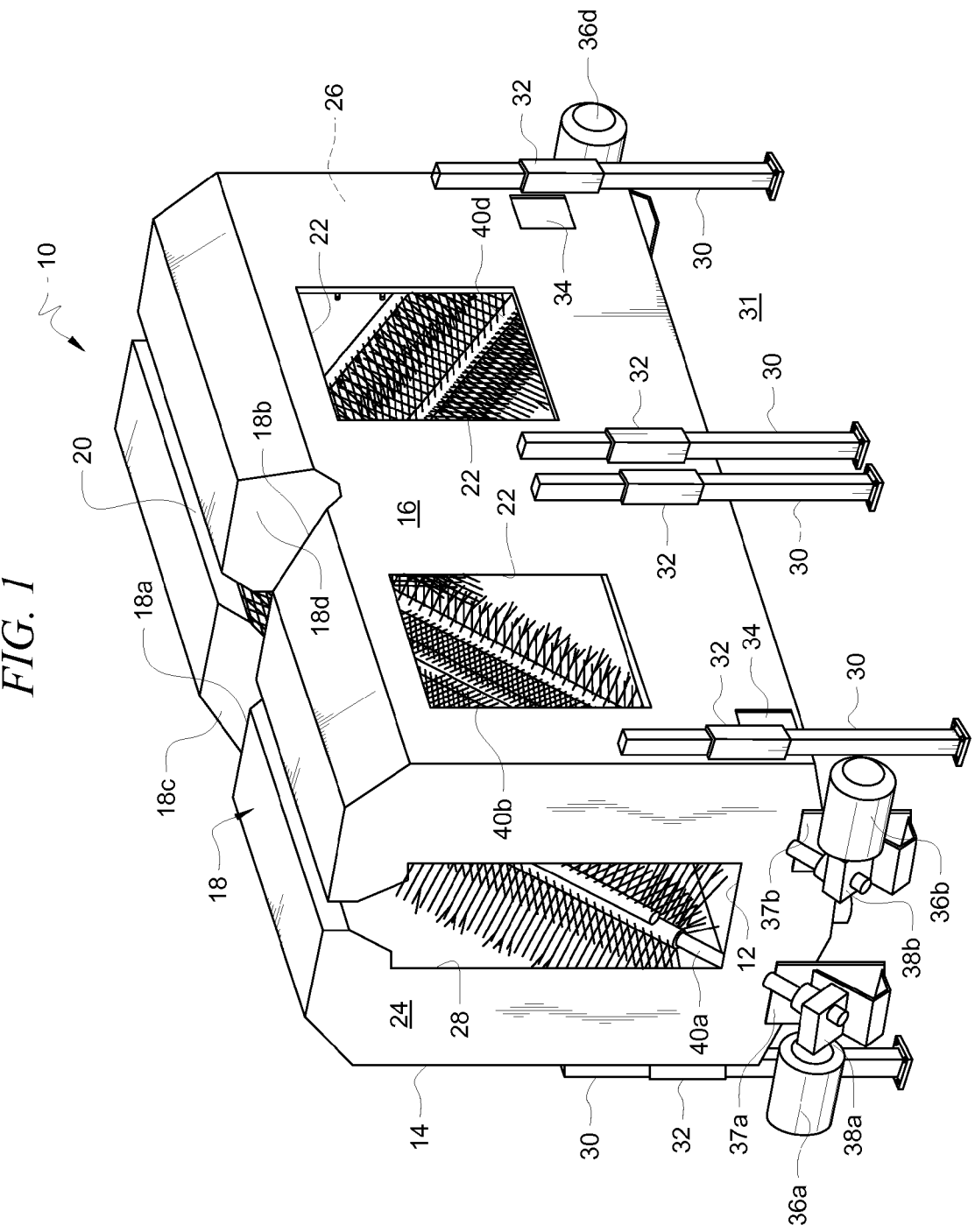
FIG. 1 is an isometric view of an illustrative embodiment of the invention.

Referring now to FIG. 1, it will there be seen that an illustrative embodiment of the invention is denoted as a whole by the reference numeral 10.

Cabinet 10 includes an imperforate bottom wall or floor 12, a pair of opposed, upstanding side walls 14, 16, and a top wall 18 having a longitudinally-extending slot 20 formed therein. Viewing windows, collectively denoted 22, are formed in the side walls.

Cabinet 10 further includes end walls 24, 26. End wall 24 has access or entry opening 28 formed therein. Note that said access opening is in open communication with slot 20 formed in top wall 18. End wall 26 has a similar exit opening that is also in open communication with said slot.

A plurality of upstanding posts, collectively denoted 30, elevate bottom wall 12 and thus washer cabinet 10 above support surface 31. More particularly, each post 30 has a bracket 32 secured thereto and each bracket is secured to a plate 34 that is secured to cabinet 10. Each bracket is securable to its associated post at any height along the extent thereof. The position of each bracket relative to its post therefore determines the distance between said bottom wall and said support surface. The brackets are positioned at a common height so that bottom wall 12 and washer cabinet 10 are substantially level. This ability to raise and lower washer cabinet 10 accommodates carcasses of differing lengths. Large carcasses, for example, may require lowering of washer cabinet 10 and smaller carcasses may require raising of said washer cabinet.

Figure 3:
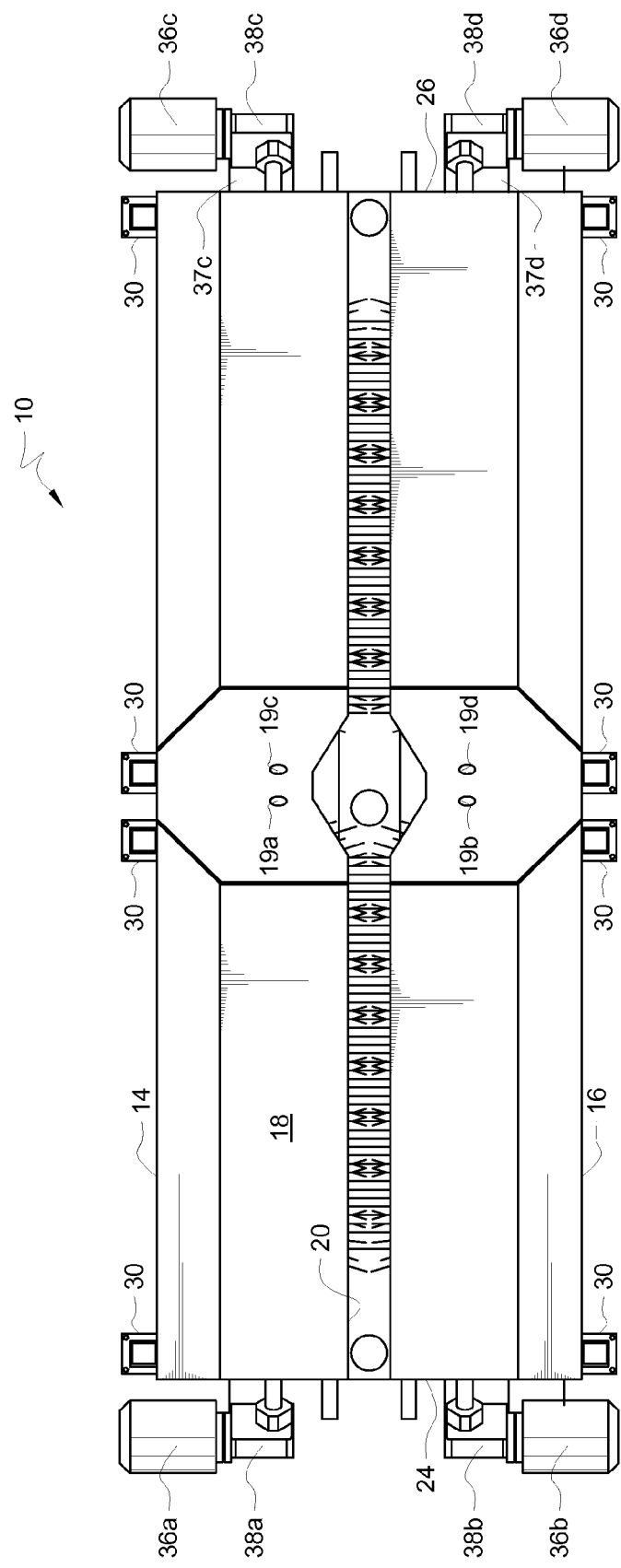
FIG. 3 is a top plan view of said illustrative embodiment.

In this embodiment, a first pair of motors, denoted 36a, 36b is secured to entry end wall 24 at a lower end thereof and a second pair of motors, collectively denoted 36c, 36d (FIG. 3), is secured to exit end wall 26 at a lower end thereof.

More particularly, each motor has an output shaft and a gear box 38a, 38b, 38c, and 38d that translates the rotation of the output shaft into rotation of an elongate driven shaft having an axis of rotation that is disposed ninety degrees from the axis of rotation of the output shaft.

There are four (4) of said motors and therefore four (4) of said elongate driven shafts. Said shafts are denoted 40a, 40b, 40c, and 40d in the Figs.

A "V"-shaped indentation is formed in top wall 18 about mid-length thereof. The indentation is transverse to the longitudinal axis of cabinet 10 and is bisected by channel 20 so that it has four parts, each of said parts being a sloped wall. The indentation includes a first sloped wall 18a and a second sloped wall 18b on opposite sides of said channel on the access end of the washer cabinet, and a third sloped wall 18c and a fourth sloped wall on opposite sides of said channel on the egress end of the washer cabinet. An unnumbered flat wall is between the sloped walls of the access and egress ends. Apertures 19a, 19b formed in sloped walls 18a, 18b, respectively, receive the upper ends of driven shafts 40a, 40b, respectively. Apertures 19c, 19d formed in sloped walls 18c, 18d receive the upper ends of driven shafts 40c, 40d, respectively. Thus it is understood that the indentation in said top wall facilitates maintenance of the driven shafts. The fluid headers are held in place by "U" bolts. One end of each fluid header protrudes through an opening formed in the cabinet wall, thereby holding that end from movement.

A plurality of appendages 42a, 42b, 42c, 42d is respectively secured to each driven shaft 40a, 40b, 40c, 40d so that said appendages extend in radial relation to the axis of rotation of their associated shaft. Appendages 42a-d may be aligned with one another to form distinct rows along a substantial part of their associated driven shafts. In the embodiment of FIG. 1, there are four (4) distinct rows of appendages 42a spaced ninety degrees from one another. However, this invention includes a larger number and a lesser number of rows. This invention also includes radially-mounted appendages that are not aligned in rows along the length of the driven shaft.

Figure 4:
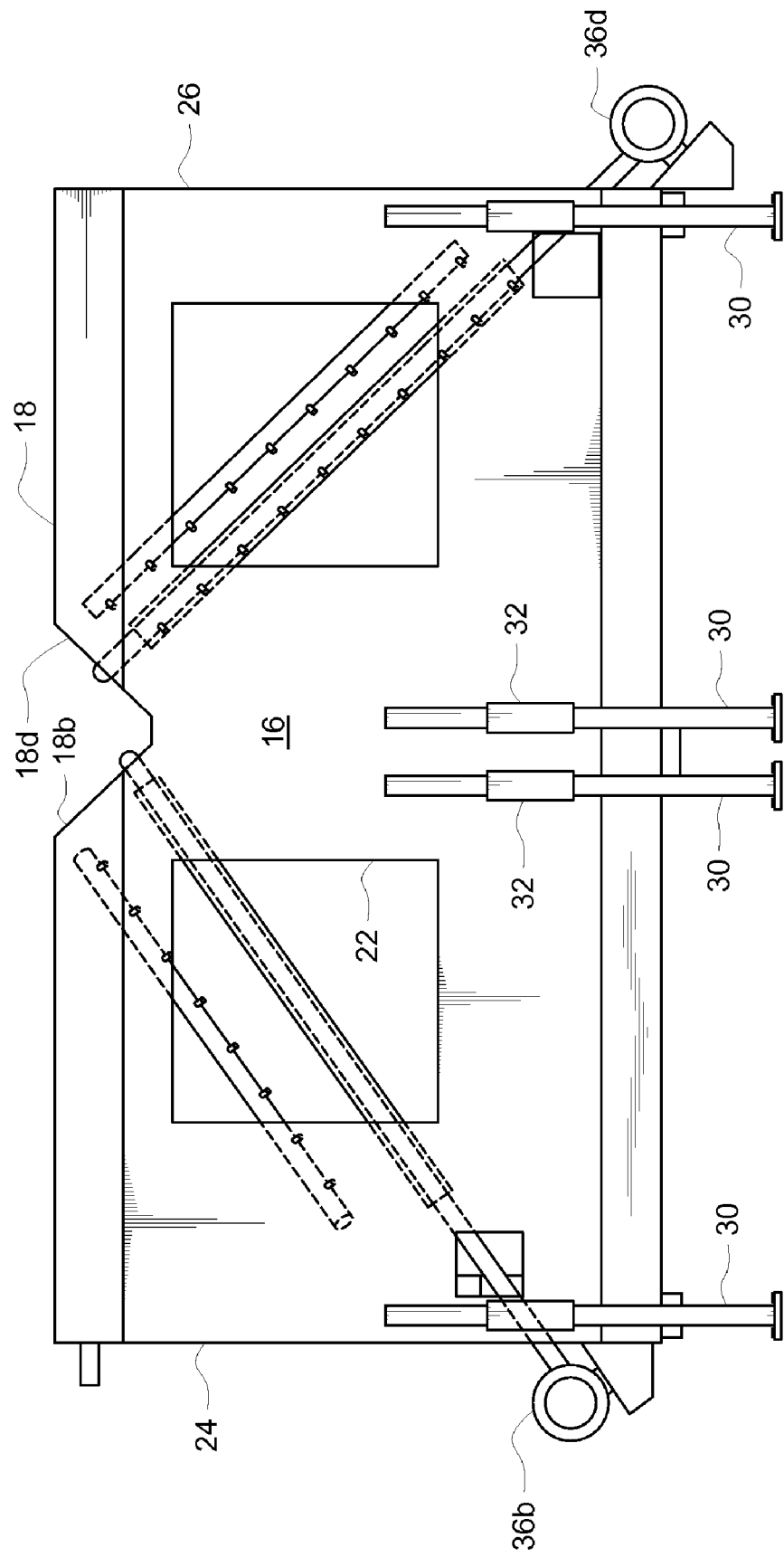
FIG. 4 is a longitudinal sectional view of said embodiment.
Figure 5:
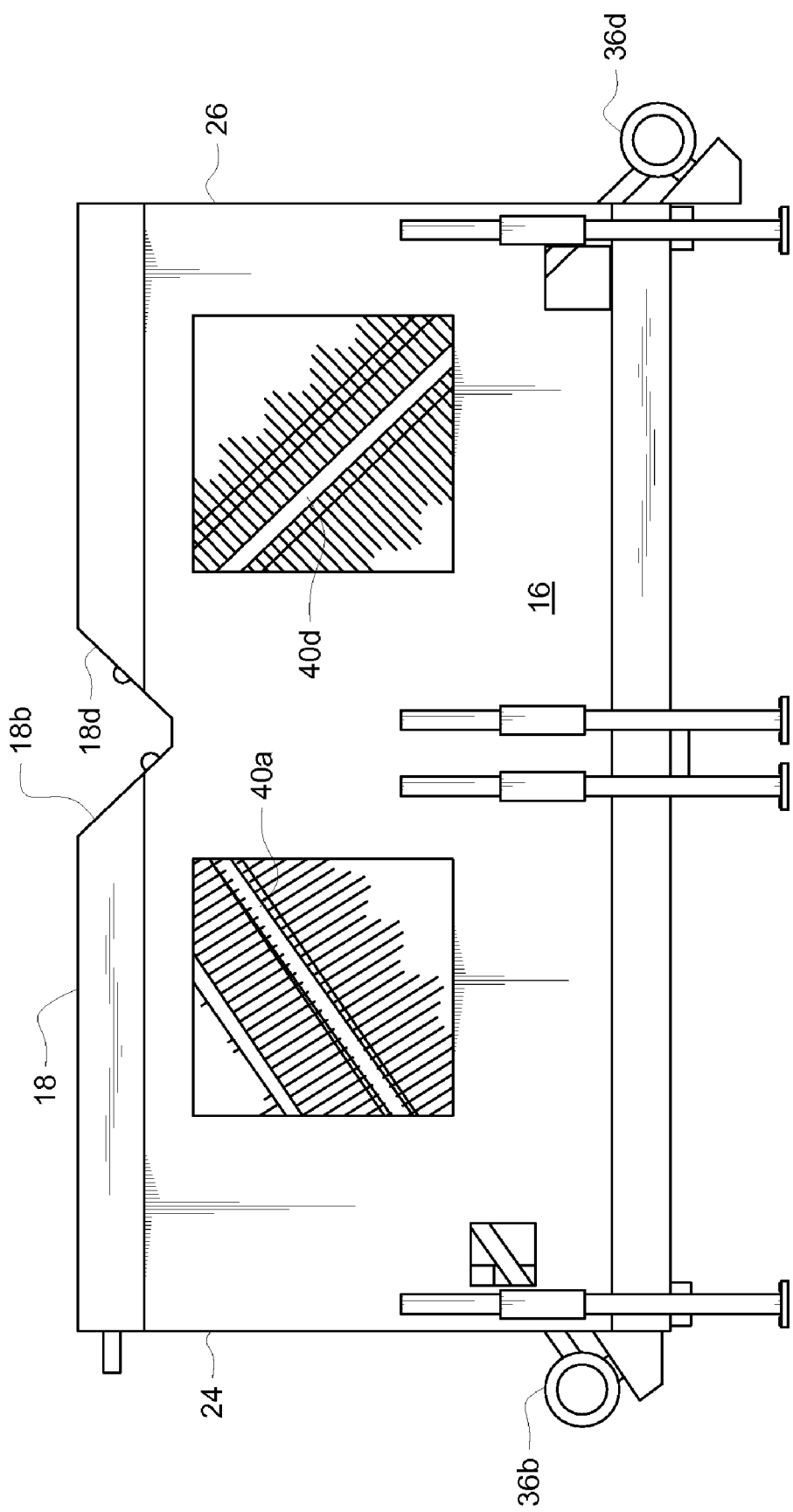
FIG. 5 is a side elevational view of said embodiment.

As best depicted in FIGS. 4 and 5, driven shafts 40a and 40b at the entry end of cabinet 10 are positioned approximately at a thirty five degree angle relative to floor 12. Driven shafts 40c and 40d at the exit end of cabinet 10 are positioned approximately at a forty five degree angle relative to floor 12. The angles may be changed to facilitate better contact with the carcass, thereby resulting in a cleaner product.

Accordingly, motors 36a, 36b are secured to entry end wall 24 by brackets 37a, 37b and motors 36c, 36d are secured to exit end wall 26 by brackets 37c, 37d. Each of said brackets has a first flat part secured to its associated end wall and three additional flat parts formed integrally therewith that are bent as depicted to hold their associated motors at the preselected angle. Said parts of the brackets are not numbered to avoid cluttering of the drawings but their structure is clearly depicted in FIG. 1. There are of course numerous other mechanical means for mounting the motors in the desired position that do not require brackets 37a-d and all of such brackets are within the scope of this invention.

There are two (2) elongate fluid headers disposed in parallel relation to each of the four (4) driven shafts. Nozzles are equidistantly spaced along the length of each fluid header. More particularly, for each driven shaft there is one (1) header positioned directly above it, i.e., in the same vertical plane and one (1) header positioned beside it, i.e., in the same horizontal plane.

Figure 2:
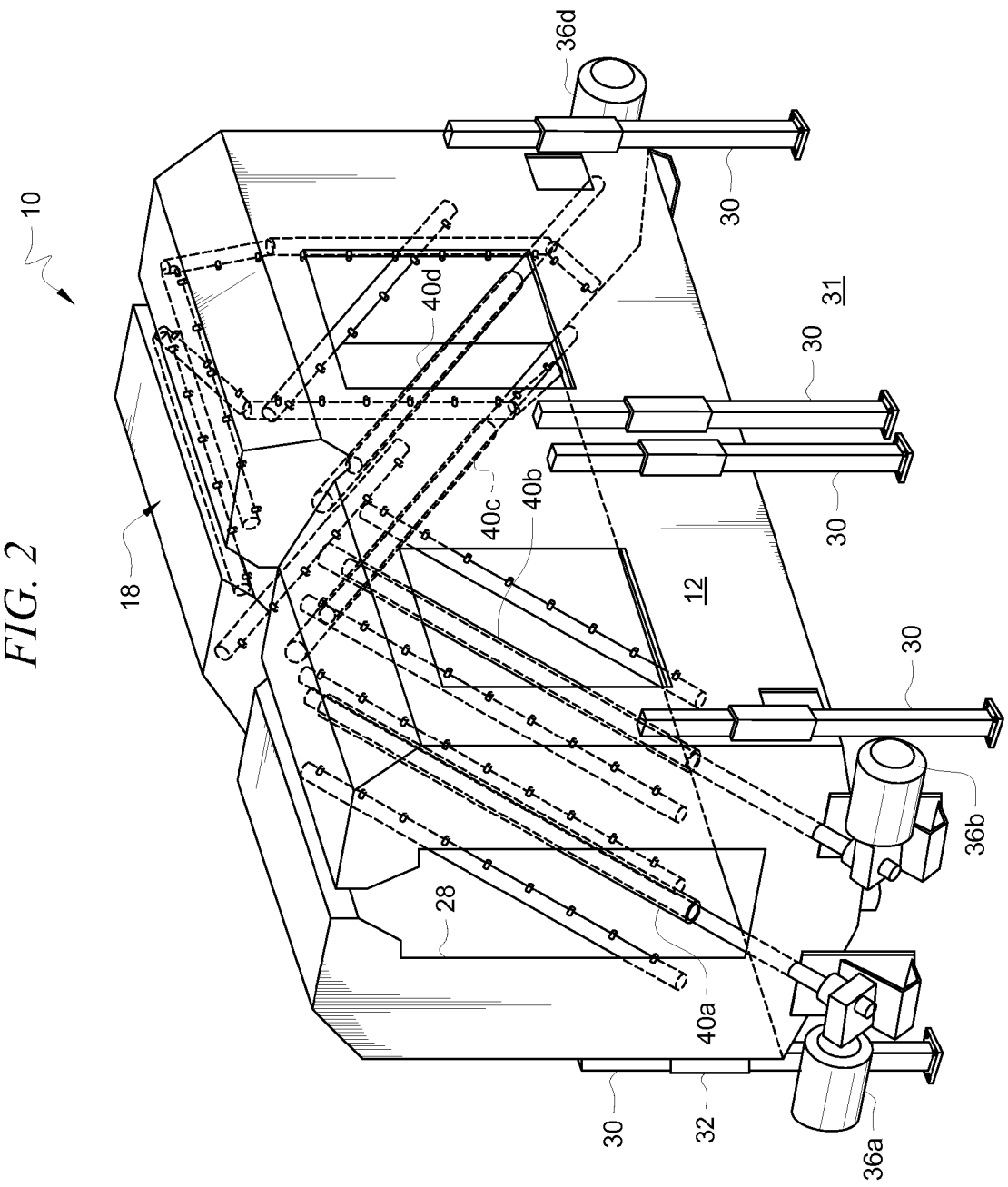
FIG. 2 is an isometric view like FIG. 1, showing hidden parts in broken lines.

In FIG. 2, the fluid header positioned above driven shaft 40a is denoted 44a and the fluid header positioned beside it is denoted 45a. The fluid header positioned above driven shaft 40b is denoted 44b and the fluid header positioned beside it is denoted 45b. The fluid header positioned above driven shaft 40c is denoted 44c and the fluid header positioned beside it is denoted 45c. The fluid header positioned above driven shaft 40d is denoted 44d and the fluid header positioned beside it is denoted 45d. First fluid header 44d sprays on the brushes to help prevent cross contamination and second fluid header 45d sprays on the product being washed.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A high efficiency, low water usage variable size carcass contaminant removal system, comprising:
    a washer cabinet having a hollow interior defined by a bottom wall, a pair of opposed, parallel side walls, a first end wall having an access opening formed therein, a second end wall having an egress opening formed therein, a top wall, and a channel formed in said top wall along the entire length of said top wall;

said access opening being in open communication with said channel and said egress opening being in open communication with said channel;

an overhead track positioned above the washer cabinet in alignment with the channel, said overhead track adapted to suspend animal carcasses therefrom in alignment with the channel;

a first driven shaft having a plurality of appendages secured thereto and extending radially therefrom;

a second driven shaft having a plurality of appendages secured thereto and extending radially therefrom;

said first and second driven shafts positioned within said hollow interior at a preselected first upwardly inclined angle common to said first and second driven shafts;

a third driven shaft having a plurality of appendages secured thereto and extending radially therefrom;

a fourth driven shaft having a plurality of appendages secured thereto and extending radially therefrom;

said third and fourth driven shafts positioned within said hollow interior at a preselected second downwardly inclined angle common to said third and fourth driven shafts;

a plurality of fluid nozzles positioned within said hollow interior of said cabinet;

whereby an animal carcass suspended from the overhead track enters into the hollow interior of the cabinet through the access opening; and whereby said animal carcass contacts said rotating appendages, is scrubbed by said rotating appendages, and is washed by fluid emitted from said fluid nozzles as it traverses the length of the washer cabinet before leaving the washer cabinet at said egress opening.

2. The system of claim 1, further comprising:

a first fluid header disposed in spaced apart, parallel relation to said first driven shaft;

a second fluid header disposed in spaced apart, parallel relation to said second driven shaft;

a third fluid header disposed in spaced apart, parallel relation to said third driven shaft;

a fourth fluid header disposed in spaced apart, parallel relation to said fourth driven shaft;

a remote source of water under pressure in fluid communication with said first, second, third and fourth fluid headers;

a first, second, third and fourth plurality of nozzles formed in said first, second, third, and fourth fluid headers, respectively, along the respective extents thereof;

whereby said rotating appendages and carcasses are washed by water emitted from said first, second, third and fourth plurality of nozzles as said carcass travels through said hollow interior of said washer cabinet.

3. The system of claim 2, further comprising:

a fifth fluid header disposed in spaced apart, parallel relation to said first driven shaft;

a sixth fluid header disposed in spaced apart, parallel relation to said second driven shaft;

a seventh fluid header disposed in spaced apart, parallel relation to said third driven shaft;

an eighth fluid header disposed in spaced apart, parallel relation to said fourth driven shaft;

said remote source of water under pressure in fluid communication with said fifth, sixth, seventh and eighth fluid headers;

a fifth, sixth, seventh and eighth plurality of nozzles formed in said fifth, sixth, seventh, and eighth fluid headers, respectively, along the respective extents thereof;

whereby said rotating appendages and carcasses are washed by water emitted from said fifth, sixth, seventh and eighth plurality of nozzles as said carcass travels through said hollow interior of said washer cabinet.

4. The system of claim 2, further comprising:

said top wall having a "V"-shaped indentation formed therein about mid-length thereof;

said "V"-shaped indentation having an axis of symmetry disposed transverse to a longitudinal axis of said washer cabinet;

said "V"-shaped indentation being bisected by said channel formed in said top wall so that said "V"-shaped indentation has four sloped surfaces that collectively form the "V'-shape;

an aperture formed in each of said four sloped surfaces;

each aperture adapted to receive an upper end of a driven shaft.

5. The system of claim 4, further comprising:

a plurality of motors secured to said washer cabinet;

said plurality of motors including a first pair of motors secured to said end wall having said access opening formed therein at a lower end thereof on opposite sides of a longitudinal axis of symmetry of said washer cabinet and a second pair of motors secured to said end wall having said egress opening formed therein at a lower end thereof on opposite sides of a longitudinal axis of symmetry of said washer cabinet;

each motor of said plurality of motors having an output shaft adapted to engage and rotate one of said driven shafts.

6. The system of claim 5, further comprising:

each of said motors being positioned below a plane of said bottom wall and each of said driven shafts having a lower end disposed below said plane of said bottom wall.

7. The system of claim 1, further comprising;

said washer cabinet being mounted in spaced relation to a support surface; and at least one drain formed in said bottom wall of said washer cabinet.

8. The system of claim 7, further comprising:

said washer cabinet being adjustably mounted with respect to said support surface so that said washer cabinet can be raised and lowered to accommodate carcasses of differing sizes.

9. The system of claim 8, further comprising:

a plurality of upstanding posts positioned about a perimeter of said washer cabinet;

a bracket secured to each of said upstanding posts;

each bracket adapted to be positioned at any height along the extent of its associated post;

each bracket including a part secured to a wall of said washer cabinet;

whereby the distance between the bottom wall of the washer cabinet and said support surface is determined by the respective positions of said brackets on their associated posts, said respective positions being uniform so that said bottom wall is substantially level.

10. A high efficiency, low water usage variable size carcass contaminant removal system, comprising:

a washer cabinet having a hollow interior defined by a bottom wall, a pair of opposed, parallel side walls, a first end wall having an access opening formed therein, a second end wall having an egress opening formed therein, a top wall, and a channel formed in said top wall along the entire length of said top wall;

said access opening being in open communication with said channel and said egress opening being in open communication with said channel;

an overhead track positioned above the washer cabinet in alignment with the channel, said overhead track adapted to suspend animal carcasses therefrom in alignment with the channel;

a plurality of rotating appendages positioned in said hollow interior of said washer cabinet, said plurality of rotating appendages adapted to remove contaminates from a carcass as said carcass is transported through said hollow interior of said cabinet by said overhead track;

a plurality of fluid nozzles positioned within said hollow interior of said cabinet;

a first driven shaft having a plurality of appendages secured thereto and extending radially therefrom;

a second driven shaft having a plurality of appendages secured thereto and extending radially therefrom;

said first and second driven shafts positioned within said hollow interior at a preselected first upwardly inclined angle common to said first and second driven shafts;

a third driven shaft having a plurality of appendages secured thereto and extending radially therefrom;

a fourth driven shaft having a plurality of appendages secured thereto and extending radially therefrom;

said third and fourth driven shafts positioned within said hollow interior at a preselected second downwardly inclined angle common to said third and fourth driven shafts;

a first fluid header disposed in spaced apart, parallel relation to said first driven shaft;

a second fluid header disposed in spaced apart, parallel relation to said second driven shaft;

a third fluid header disposed in spaced apart, parallel relation to said third driven shaft;

a fourth fluid header disposed in spaced apart, parallel relation to said fourth driven shaft;

a remote source of water under pressure in fluid communication with said first, second, third and fourth fluid headers;

a first, second, third and fourth plurality of nozzles formed in said first, second, third, and fourth fluid headers, respectively, along the respective extents thereof;

said top wall having a "V"-shaped indentation formed therein about mid-length thereof;

said "V"-shaped indentation having an axis of symmetry disposed transverse to a longitudinal axis of said washer cabinet;

said "V"-shaped indentation being bisected by said channel formed in said top wall so that said "V"-shaped indentation has four sloped surfaces that collectively form the "V'-shape;

an aperture formed in each of said four sloped surfaces; and each aperture adapted to receive an upper end of a driven shaft;

whereby an animal carcass suspended from the overhead track enters into the hollow interior of the cabinet through the access opening;

whereby said animal carcass contacts said rotating appendages, is scrubbed by said rotating appendages, and is washed by fluid emitted from said fluid nozzles as it traverses the length of the washer cabinet before leaving the washer cabinet at said egress opening; and whereby said rotating appendages and carcasses are washed by water emitted from said first, second, third, and fourth plurality of nozzles as said carcass travels through said hollow interior of said washer cabinet.

11. The system of claim 10, further comprising:

a plurality of motors secured to said washer cabinet;

said plurality of motors including a first pair of motors secured to said end wall having said access opening formed therein at a lower end thereof on opposite sides of a longitudinal axis of symmetry of said washer cabinet and a second pair of motors secured to said end wall having said egress opening formed therein at a lower end thereof on opposite sides of a longitudinal axis of symmetry of said washer cabinet;

each motor of said plurality of motors having an output shaft adapted to engage and rotate one of said driven shafts.

12. The system of claim 11, further comprising:

each of said motors being positioned below a plane of said bottom wall and each of said driven shafts having a lower end disposed below said plane of said bottom wall.

* * * * *